United States Patent

Vasta

[15] 3,687,879
[45] Aug. 29, 1972

[54] COATING COMPOSITION OF AN EPOXY RESIN, AN AROMATIC SULFONAMIDE, A SILICONE RESIN AND A CROSS-LINKING CATALYST

[72] Inventor: Joseph A. Vasta, Woodbury, N.J.
[73] Assignee: E. I. du Pont de Nemours and Company, Wilmington, Del.
[22] Filed: Dec. 16, 1970
[21] Appl. No.: 98,851

[52] U.S. Cl.....260/18 EP, 117/132 BE, 117/132 BS, 260/37 EP, 260/47 EP, 260/824 EP
[51] Int. Cl. ............................................C08g 45/16
[58] Field of Search........260/18 EP, 824 EP, 30.8 R, 260/37 EP, 47 EP; 117/132 BE, 132 BS

[56] References Cited

UNITED STATES PATENTS

| | | | |
|---|---|---|---|
| 2,712,001 | 6/1955 | Greenlee | 260/47 |
| 2,819,245 | 1/1958 | Shorr | 260/824 |
| 3,055,858 | 9/1962 | Frye et al | 260/824 |
| 3,154,597 | 10/1964 | McWhorter | 260/824 |
| 3,533,980 | 10/1970 | Minuto | 260/30.8 |

FOREIGN PATENTS OR APPLICATIONS

| | | | |
|---|---|---|---|
| 864,697 | 4/1961 | Great Britain | 260/824 |
| 656,225 | 1/1963 | Canada | 260/824 |

*Primary Examiner*—Donald E. Czaja
*Assistant Examiner*—Eugene C. Rzucidlo
*Attorney*—Holmar L. Fricke

[57] ABSTRACT

The novel coating composition is a mixture of a low molecular weight epoxy resin, an aromatic sulfonamide, e.g., N-cyclohexyltoluene sulfonamide, a reactive silicone resin and a cross-linking catalyst, e.g., zinc octoate. The coating composition has excellent release properties, stain resistance, water repellency, and is useful as a release coating for icecube trays, for bakeware and cookware, and can be utilized to coat sinks, oven parts and as a clear coating for hardware.

10 Claims, No Drawings

COATING COMPOSITION OF AN EPOXY RESIN, AN AROMATIC SULFONAMIDE, A SILICONE RESIN AND A CROSS-LINKING CATALYST

BACKGROUND OF THE INVENTION

This invention relates to a coating composition and in particular, to a high quality coating composition which forms a finish that has excellent release properties.

Coating compositions containing epoxy resins, aromatic sulfonamides or reactive silicone resins are known in the art and coatings manufactured from these various resins are useful for many purposes. In particular, Greenlee U.S. Pat. No. 2,494,295, issued Jan. 10, 1950, is directed to the formation of coating compositions of resinous epoxides and an aldehyde aryl sulfonamide resin; Greenlee, U.S. Pat. No. 2,712,001, issued June 28, 1955 is directed to coating compositions containing blends of sulfonamides resins and epoxy resin compositions; coatings of silicone modified epoxy resins are also known. None of the aforementioned coating compositions provide acceptable finishes for contact with foods and finishes with the excellent release properties, stain resistance, water repellency and hardness that is required for many uses, such as coating icecube trays and bakeware.

There is a great need in the coating industry for a high quality coating composition that provides a finish that has food grade acceptability and with the unique characteristics of excellent release properties, stain resistance, water repellency, in combination with hardness and durability. These characteristics have not been provided by the conventional coating compositions. The novel coating composition of this invention has these aforementioned desirable physical properties.

SUMMARY OF THE INVENTION

The coating composition of this invention comprises a solution of 10–60 percent by weight of the film-forming polymer blend and 90–40 percent by weight of an organic solvent, wherein the film-forming polymer blend consists essentially of the following ingredients:

1. 49–98.5 percent by weight, based on the weight of the polymer blend, of a low molecular weight epoxy resin and an aromatic sulfonamide having a molar ratio of about 1.5:1 to about 2.5:1; wherein epoxy resin is either
   a. an epoxy hydroxy polyether resin of the general formula

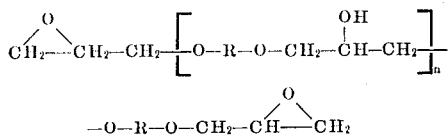

wherein $n$ is a positive integer sufficient to provide an epoxide equivalent * (*Epoxide Equivalent — grams of resin containing one gram equivalent of epoxide.) of 100–1,025 and R is either

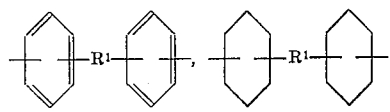

an alkylene radical having two to six carbon atoms or a cyclohexylene group; or b. one of the following cycloaliphatic epoxy resins:

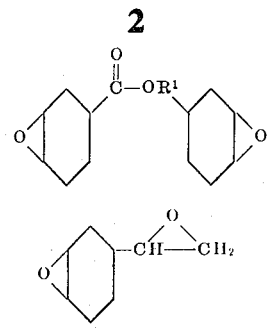

wherein $R^1$ of the above epoxy resins is an alkylene radical of one to four carbon atoms; and the aromatic sulfonamide is of the general formula $R^2 - SO_2 - NH - R^3$ wherein $R^2$ is a monovalent aromatic radical and $R^3$ is either hydrogen, cycloaliphatic radical or an alkyl group having one to 18 carbon atoms;

2. 0.5–50 percent by weight, based on the weight of the polymer blend, of a reactive silicone resin of the formula

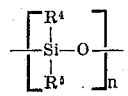

wherein $n$ is a positive inter sufficiently high to provide a molecular weight of 300 to 4,000; and $R^4$ and $R^5$ are either $-OCH_3$, phenyl, or $-OH$; and the composition contains about 0.1–5 percent by weight, based on the weight of the polymer blend, of a cross-linking catalyst.

DESCRIPTION OF THE INVENTION

The novel coating composition of this invention is a solution that preferably contains about 20–40 percent by weight of a film-forming polymer blend and 80–60 percent by weight of a solvent for the polymer blend and can contain 0.1–20 percent by weight pigment. The novel coating composition preferably contains 59–80 percent by weight, based on the weight of the polymer blend, of a low molecular weight epoxy resin and an aromatic sulfonamide in a molar ratio of about 2:1, 15–40 percent by weight of a reactive silicone resin and 0.1–5 percent by weight of a cross-linking catalyst of an organo metal compound.

Finishes of the novel composition have particularly excellent physical properties such as good release properties, stain resistance, water repellency, excellent adhesion to primed and unprimed metal substrates, toughness, hardness, crack and mar resistance. The composition is particularly useful as a release coating for icecube trays and bakeware, as a coating for range parts, plumbing fixture such as sinks, and as a clear coating for hardware items, such as saws, chisels, planes, knives and the like. Also, the coating composition can be utilized as a primary finish for refrigerators, stoves, washers, dryers and the like.

The coating composition is prepared by cold mixing the epoxy resin, aromatic sulfonamide, reactive silicone resin, and a cross-linking agent in a conventional solvent. Typical conventional solvents are, for example, toluene, xylene, butyl acetate, acetone, methyl isobutyl ketone, methyl ethyl ketone, butyl alcohol, hexane, cyclohexanone, cellosolve, cellosolve acetate, and other aliphatic, cycloaliphatic, aromatic hydrocarbons, esters, ethers, ketones and alcohols.

The epoxy resins utilized in preparing the novel coating composition of this invention are either epoxy hydroxy polyether resins, or cycloaliphatic epoxy resins. The epoxy resin is utilized with the aromatic sulfonamide in a molar ratio to about 1:5:1 to about 2:5:1 and preferably, a 2:1 molar ratio is utilized.

The epoxy hydroxy polyether resins that are utilized in the novel coating composition of this invention are the reaction products of bisphenol and epichlorohydrin and have the following structural formula

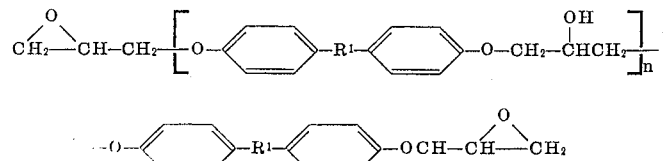

where R' is an alkylene radical having one to four carbon atoms and $n$ is a positive integer sufficiently large to provide an epoxide equivalent of 100 to 1,025.

One preferred epoxy resin is the reaction product of epichlorohydrin and bisphenol A. Bisphenol A has the following formula:

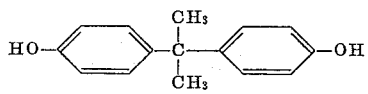

This particular epoxy resin gives a finish with desirable physical properties such as toughness and durability.

Another very useful epoxy resin is the reaction product of epichlorihydrin and bisphenol F. Bisphenol F has the following formula:

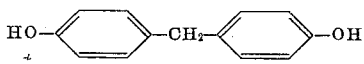

This particular resin also gives a quality finish.

Another group of useful epoxy resins are the reaction product of hydrogenated bisphenol and epichlorohydrin. Hydrogenated bisphenol A or hydrogenated bisphenol F can be reacted with epichlorohydrin to prepare these resins.

Aliphatic polyglycidyl ethers of glycidyl ethers of alkylene glycols having two to six carbon atoms in the alkylene group can also be used in the novel coating composition of this invention. The following are typically useful resins:

diglycidyl ether of ethylene glycol,
diglycidyl ether of neopentyl glycol,
diglycidyl ether of propane diol,
diglycidyl ether of butane diol,
diglycidyl ether of hexane diol ad the like.

Diglycidyl ethers of cycloaliphatic diols can also be used, such as the diglycidyl ether of cyclohexane diol.

The cycloaliphatic epoxy resins that can be utilized in a coating composition of this invention have the general formula

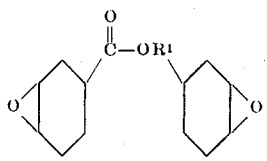

where R' is an alkylene radical having one to four carbon atoms. One particularly useful resin wherein R' is —CH$_2$— is 3,4-epoxycyclohexylmethyl, 3,4-epoxy-cyclohexane carboxylate. This compound provides coatings of exceptional quality.

Another useful class of cycloaliphatic epoxy resins are the peracid epoxides, such as vinyl cyclohexene dioxide which has the formula

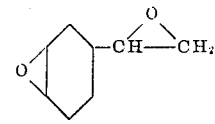

The aromatic sulfonamide utilized in the coating composition of this invention is of the general formula $R^2 — SO_2 — NH — R^3$, wherein $R^2$ is a monovalent aromatic radical and $R^3$ is either hydrogen, a monovalent cycloaliphatic radical or an alkyl group having one to 18 carbon atoms. Typical aromatic sulfonamides are for example:

para toluene sulfonamide,
N-methyl para toluene sulfonamide,
N-ethyl para toluene sulfonamide,
N-propyl para toluene sulfonamide,
N-butyl para toluene sulfonamide,
N-hexyl para toluene sulfonamide,
N-octyl para toluene sulfonamide,
N-nonyl para toluene sulfonamide,
N-dodecyl para toluene sulfonamide,
N-lauryl para toluene sulfonamide,
N-tridecyl para toluene sulfonamide,
N-quadra decyl para toluene sulfonamide,
N-stearyl para toluene sulfonamide,
benzene sulfonamide,
naphthalene sulfonamide,
N-cyclohexyl toluene sulfonamide, and the like.

One particularly preferred aromatic sulfonamide that forms a finish with excellent release properties is N-cyclohexyl toluene sulfonamide.

The reactive silicone resin utilized in the coating composition of this invention has the following formula

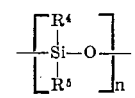

wherein $n$ is a positive integer sufficiently high to provide a molecular weight of 300 to 4,000; and $R^4$ and $R^5$ are either —OCH$_3$, —OH, or phenyl. One preferred silicone resin is methylphenyl polysiloxane.

The cross-linking agent utilized in the novel coating composition of this invention is preferably an organometal compound, for example, of zinc, tin, lithium or titanium. Typical compounds that can be used are zinc octoate, tin octoate, lithium octoate, zinc naphthenate, tin naphthenate, lithium naphthenate, alkyl tin dilaurate, such as dibutyl tin dilaurate, and titanate esters such as the reaction product two moles of 2,4-pentanedione and one mole of tetraisopropyl titanate.

Pigments are used in the novel coating composition of this invention in the amounts of 0.1–20.0 percent by weight, and preferably, about 0.3–6.0 percent by weight of pigment, is used. Preferably, the pigment is formed into a mill base using conventional techniques and then is blended with the composition. Examples of the great variety of pigments which are used in the novel coating composition of this invention are metallic oxides, preferably titanium dioxide, zinc oxide, and the like, metal hydroxides, meal flakes, metal powders, sulfides, sulfate, carbonates, carbon black, silica, silicates, hydrophobic silicates, such as silicone treated with silicone dioxide, talc, china clay, iron blues, organic reds, maroons and other organic dyes and lakes.

The novel coating compositions of this invention can be applied to a variety of substrates, for example, metal or glass, by any of the usual application methods, such as spraying, electrostatic spraying, dipping, brushing, flow coating, and the like. These coatings are baked at about 80° C. to 500° C. for about 10 minutes to 2 hours. The resulting coating is about 1–5 mils thick and preferably 1–3 mils thick.

The novel coating composition of this invention has excellent adhesion to bare or treated metals or to metals which have been previously primed or painted with alkyd, epoxy or acrylic enamels. Also, the novel composition can be a highly pigmented coating or can be used as a clear coating.

The following Examples illustrate this invention. The parts and percentages are by weight unless otherwise specified.

EXAMPLE 1

| | Parts by Weight |
|---|---|
| Titanium Dioxide Pigment (Rutile) | 100.0 |
| N-cyclohexyl toluene sulfonamide solution | 45.0 |
| Epoxy resin (the resin has an epoxide equivalent of 180–185 and has the following structural formula | 52.5 |

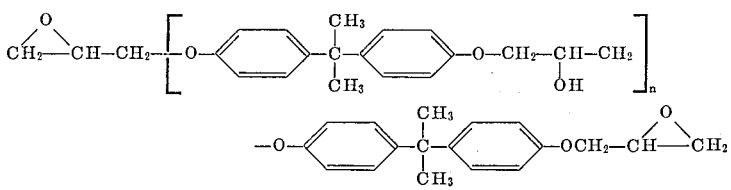

where $n$ is a positive integer)

| | |
|---|---|
| Silicone resin solution (50% solids in toluene of | 50.0 |

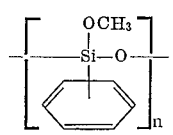

| | |
|---|---|
| where $n$ is a positive integer sufficiently large to provide the solution viscosity of about 18.3 centipoises at 25° C. and the resin has a specific gravity of 1.027) | 55 |
| Zinc octoate (8% zinc) | 2.5 |
| Cyclohexanone | 50.0 |
| Total: | 300.0 |

The above ingredients are premixed and charged into a conventional sandmill and ground into a fineness of 0.0. The resulting composition is reduced to a spray viscosity using xylene and sprayed onto an unprimed aluminum panel. The coating is baked for 15 minutes at 250° C. The resulting coating is mar-resistant, has excellent release properties, has excellent adhesion to the substrate, and water and oil form beads on the coating.

EXAMPLE 2

| | Parts by Weight |
|---|---|
| Titanium dioxide pigment (Rutile) | 42.50 |
| N-cyclohexyl toluene sulfonamide solution (50% solids in cyclohexanone) | 9.56 |
| Epoxy resin (3,4-epoxy cyclohexylmethyl-3,4-epoxycyclohexanecarboxylate) that has the formula | 22.31 |

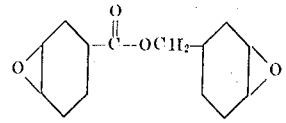

| | |
|---|---|
| Silicone resin solution (described in Example 1) | 21.25 |
| Diacetone alcohol | 4.38 |
| TOTAL: | 100.00 |

The above ingredients are premixed and about 0.25 part by weight of a catalyst is added to the composition and thoroughly blended with the composition. The catalyst is the reaction product of 2 moles of 2,4-pentanedione and one mole of tetraisopropyl titanate.

The composition is then charged into a conventional sandmill and ground to a 0.0 fineness. The composition is reduced to a spray viscosity using xylene and sprayed on an unprimed aluminum panel. The panel is then baked for 15 minutes at 250° C. The resulting coating is mar-resistant and has a flat finish and has a pencil hardness of 8H.

What is claimed is:

1. A coating composition comprising 10–60 percent by weight of a polymer blend and 90–40 percent by weight of a solvent for the polymer blend wherein the polymer blend consists essentially of
   1. 49 to 98.5 percent by weight, based on the weight of the polymer blend, of a mixture of a low molecular weight epoxy resin and an aromatic sulfonamide in a molar ratio of about 1.5:1 to about 2.5:1;
   wherein the epoxy resin is selected from the group consisting of
   (a) an epoxy polyether resin of the formula

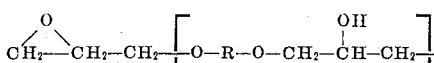

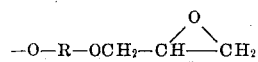

where $n$ is a positive integer sufficient to provide an epoxide equivalent of 100–1025 and R is selected from the group consisting of

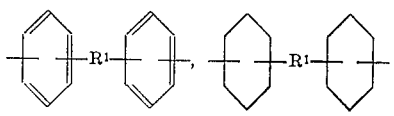

an alkylene radical having 2-6 carbon atoms and a cyclohexylene radical;
(b) a cycloaliphatic epoxy resin selected from the group consisting of

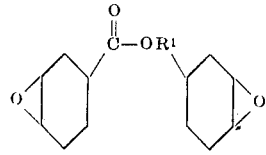

and

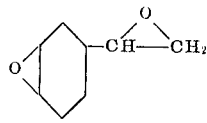

where $R^1$ of the above resins is an alkylene radical having 1-4 carbon atoms; and the aromatic sulfonamide is of the formula $R^2-SO_2-NH-R^3$ wherein $R^2$ is a monovalent aromatic radical and $R^3$ is selected from the group consisting of hydrogen, a monovalent cycloaliphatic radical and an alkyl group having 1-18 carbon atoms;
(2) 0.5-50% by weight, based on the weight of the polymer blend, of a reactive silicone resin of the formula

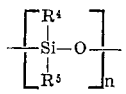

wherein $n$ is a positive integer sufficiently high to provide a molecular weight of 300 to 4000; and $R^4$ and $R^5$ are individually selected from the group consisting of $-OCH_3$, $-OH$, and phenyl; and the composition contains 0.1-5% be weight, based on the weight of the polymer blend, of a cross-linking catalyst selected from the group consisting of zinc octoate, tin octoate, lithium octoate, zinc naphthenate, tin naphthenate lithium naphthenate, alkyl tin dilaurate and a titanate, ester.

2. The coating composition of claim 1 containing 0.1-20% be weight of pigment and 20-40% be weight of the polymer blend.

3. The coating compoistion of claim 2 is which $R^3$ is

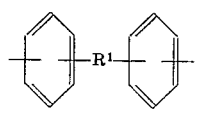

and $R^1$ is selected from the group consisting of

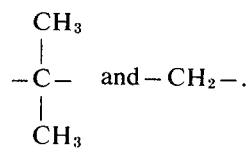

4. The coating composition of claim 2 in which R is

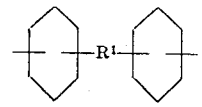

and $R^1$ is selected from the group consisting of

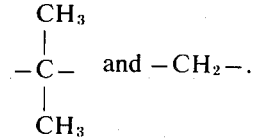

5. The coating composition of claim 2 in which the epoxy resin is

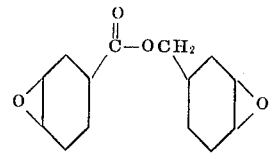

6. The coating composition of claim 2 in which the epoxy is

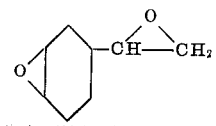

7. The coating composition of claim 2 in which the aromatic sulfone amide is N-cyclohexyl toluene sulfonamide.

8. The coating composition of claim 2 in which the epoxy resin is of the formula

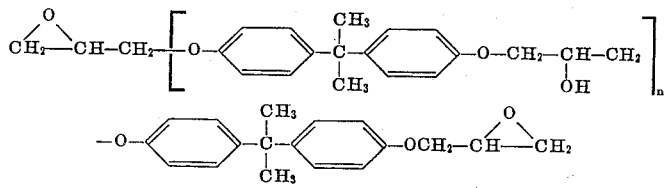

where $n$ is a positive integer sufficient to provide an epoxide equivalent of 100-1,025; the aromatic sulfonamide is N-cyclohexyl toluene sulfonamide; $R^4$ of the silicone resin is $-OCH_3$ and $R^5$ is phenyl and catalyst is zinc octoate.

9. The coating composition of claim 2 in which the epoxy resin is

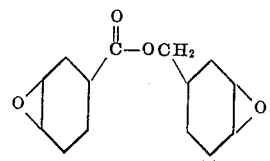

aromatic sulfonamide is N-cyclohexyl toluene sulfonamide; $R^4$ of the silicone resin is $-OCH_3$ and $R^5$ is phenyl; and the catalyst is a titanate ester of pentanedione and tetraisopropyl titanate.

10. A metal substrate coated with a dried coalesced layer of the composition of claim 1.

* * * * *

UNITED STATES PATENT OFFICE
CERTIFICATE OF CORRECTION

Patent No. 3,687,879            Dated August 29, 1972

Inventor(s) Joseph A. Vasta

It is certified that error appears in the above-identified patent and that said Letters Patent are hereby corrected as shown below:

Claim 1, column 6, line 60, delete formula and insert the following formula:

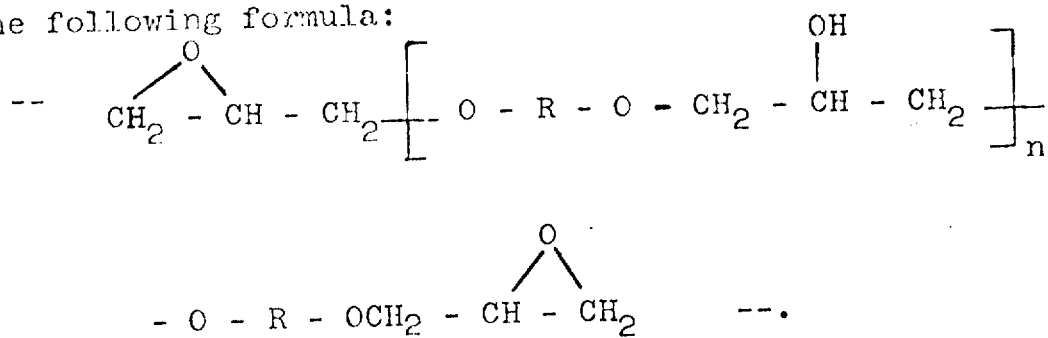

Claim 1, column 7, line 50, after "5%" delete "be" and insert -- by --.

Claim 3, column 7, line 60, after "which" delete "$R^3$" and insert -- R --.

Signed and sealed this 30th day of January 1973.

(SEAL)
Attest:

EDWARD M. FLETCHER, JR.
Attesting Officer

ROBERT GOTTSCHALK
Commissioner of Patents